United States Patent Office 3,063,990
Patented Nov. 13, 1962

3,063,990
CYCLOPENTANOPHENANTHRENYL-OXAZINES
Martin Eric Kuehne, Summit, N.J., assignor to Ciba
Corporation, a corporation of Delaware
No Drawing. Filed Feb. 12, 1960, Ser. No. 8,230
22 Claims. (Cl. 260—239.55)

The present invention relates to oxazine-type compounds, particularly to compounds of the formula

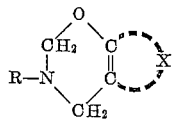

in which the divalent radical of the formula

stands for a carbocyclic arylene radical, and in which R stands for one of the radicals of the formula

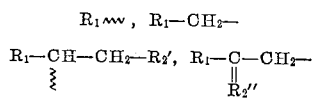

or $R_1-CH-CH_3$
$\quad\;\; |$
$\;\;\; CH_2-(CH_2)_n-$ in which formulae $R_1$ represents a 17-polyhydro-cyclopentanophenanthrenyl radical, $R_2'$ represents hydrogen or functionally converted hydroxy, $R_2''$ stands for H(H), oxo or functionally converted oxo and $n$ stands for one of the numbers 0, 1, 2, 3 or 4, or in which R stands for a 3-polyhydro-cyclopentanophenanthrenyl radical, as well as for a 6-polyhydro-cyclopentanophenanthrenyl radical or a 16-polyhydro-cyclopentanophenanthrenyl radical, salts or quaternary ammonium compounds thereof, as well as process for the preparation of such compounds.

The carbocyclic arylene radical of the previously-shown formula may be represented by a 1,2-phenylene radical, which may be unsubstituted or may contain as substituents lower alkyl, e.g. methyl, ethyl and the like, etherified hydroxy, particularly lower alkoxy, e.g. methoxy, ethoxy and the like, esterified hydroxy, particularly halogeno, e.g. fluoro, chloro, bromo and the like, etherified mercapto, particularly lower alkyl-mercapto, e.g. methylmercapto, ethylmercapto and the like, nitro, amino, especially acylated amino, such as lower alkanoyl-amino, e.g. acetylamino, propionyl amino and the like, as well as N,N-disubstituted amino, such as N,N-di-lower alkyl-amino, e.g. N,N-dimethylamino, N,N-diethylamino and the like, halogeno-lower alkyl, e.g. trifluoromethyl, or any other substituents. In a 1,2-phenylene radical of the formula

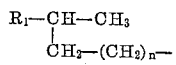

in which the carbon atom representing position 1 is attached to the oxygen atom of the oxazine ring, one or more than one of the same or of different substituents may be attached to any of the available positions, but advantageously to the 4-position of such 1,2-phenylene radical.

The carbocyclic arylene radical may also stand for a bicyclic carbocyclic arylene radical, particularly for a 1,2-naphthylene radical, which may be unsubstituted or substituted by one or more than one of the same or of different substituents; substituents are, for example, those mentioned hereinbefore. In the 1,2-naphthalene radical of the formula

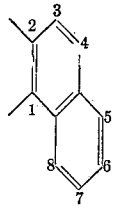

in which the carbon atom representing the 2-position is attached to the oxygen atom of the oxazine ring, such substituents are advantageously attached to the 4-position, the 5-position, the 6-position, the 7-position and/or the 8-position. A bicyclic carbocyclic arylene radical may also stand for a 2,3-naphthylene radical, particularly if the 1-position of such 2,3-naphthylene radical carries a substituent.

Although the carbocyclic arylene radical in the above formula is preferably a monocyclic or a bicyclic carbocyclic 1,2-arylene radical, it may also stand for other polycyclic carbocyclic arylene radicals, such as, for example, 1,2-phenanthrylene, 2,3-phenanthrylene, 3,4-phenanthrylene and the like, whereby these radicals may be unsubstituted or contain as substituents one or more than one of the previously-mentioned substituents.

$R_1$, representing a 17-polyhydro-cyclopentanophenanthrenyl radical, has the general formula

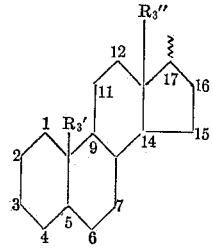

in which $R_3'$ stands for hydrogen or methyl, and $R_3''$ represents methyl, hydroxymethyl, functionally converted hydroxy-methyl, such as esterified hydroxy-methyl or etherified hydroxy-methyl, oxo-methyl or functionally converted oxo-methyl. This above-shown polyhydro-cyclopentanophenanthrenyl radical is attached through the 17-position directly or by way of one of the previously-shown carbon chains with the nitrogen atom of the oxazine nucleus.

The above-depicted 17-polyhydro-cyclopentanophenanthrenyl radical may carry additional substituents, such as, for example, lower aliphatic hydrocarbons, particularly lower alkyl, e.g. methyl, ethyl and the like; such radicals are primarily present in the 1-position, the 2-position, the 6-position, the 11-position, the 12-position and/or the 16-position. Functional groups may also be attached to the 17-polyhydro-cyclopentanophenanthrenyl radical; functional groups are particularly oxygen-containing functional groups, such as hydroxy, functionally converted hydroxy, particularly esterified hydroxy and the like, oxo or functionally converted oxo, particularly ketalized oxo and the like.

An esterified hydroxy group, which may also represent the radical $R_2'$ attached to one of the two-carbon chains previously mentioned, as well as the esterified hydroxy portion in the functionally converted hydroxy-methyl group $R_3''$ mentioned hereinbefore, is primarily a hydroxy group esterified with pharmaceutically acceptable organic carboxylic acids containing from one to twelve carbon atoms, such as aliphatic hydrocarbon carboxylic acids, for example, alkanoic acids, primarily lower alkanoic acids, e.g. formic, acetic, propionic, butyric, pivalic, heptanoic acid and the like, lower alkenoic acids, e.g. undecylenic acid and the like, cycloalkyl-lower alkane carboxylic acids, e.g. cyclohexylacetic, cyclopentylpropionic acid and the like, aliphatic hydrocarbon dicarboxylic acids, such as lower alkane dicarboxylic acids, e.g. succinic, glutaric acid, or halfesters of such dicarboxylic acids with lower alkanol, e.g. methanol, ethanol and the like, or cycloalkene dicarboxylic acids, e.g. tetrahydrophthalic acid and the like, carbocyclic aryl carboxylic acids, such as monocyclic carbocyclic aryl carboxylic acids, e.g. benzoic acid and the like, carbocyclic aryl- aliphatic hydrocarbon carboxylic acids, such as monocyclic carbocyclic aryl-lower alkane carboxylic acids, e.g. phenylacetic, diphenylacetic, 3-phenylpropionic acid and the like, or any other suitable carboxylic acid. Hydroxy groups and hydroxy groups esterified with carboxylic acids may advantageously be attached to the 3-position, the 6-position, the 7-position, the 11-position, the 12-position, the 14-position, the 16-position and/or the 17-position.

Other esterified hydroxy groups are, for example, those esterified with hydrohalic acids, which may be represented by halogeno atoms, e.g. fluoro, chloro, bromo and the like; these halogeno atoms may advantageously be attached to the 2-position, the 4-position, the 6-position, the 9-position, the 12-position and/or the 16-position. A hydroxy group esterified by a mineral acid, i.e. a halogeno atom, may also represent the group $R_2'$ attached to one of the two-carbon chains previously mentioned.

Oxo groups and/or ketalized oxo groups may be attached to the 3-position, the 7-position, the 11-position and/or the 12-position; a ketalized oxo group is primarily ketalized with a lower alkylene glycol, e.g. ethylene glycol, propylene glycol and the like. An oxo or functionally converted oxo group, as described hereinabove, may also represent the substituent $R_2''$ in one of the previously-shown two-carbon side chains, as well as the oxo or functionally converted oxo group in the oxo-methyl or functionally converted oxo-methyl group designated as $R_3''$ and attached to the 13-position of the polyhydro-cyclopentanophenanthrenyl radical.

The polyhydro-cyclopentanophenanthrenyl radical may also contain double bonds between neighboring carbon atoms; such double bonds may be located, for example, at the 1,2-position, the 3,4-position, the 4,5-position, the 5,6-position, the 9,11-position, the 14,15-position and/or the 16,17-position.

The radical R may also stand for a 3-polyhydro-cyclopentanophenanthrenyl nucleus of the formula

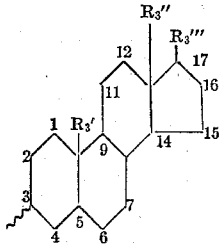

in which $R_3'$ and $R_3''$ have the previously-given meaning, and $R_3'''$ represents hydrogen, hydroxy, functionally converted hydroxy, particularly esterified hydroxy, oxo or functionally converted oxo, or one of the groups of the formulae $$-COOR_4', -CH_2-R_4''$$

or

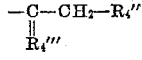

in which $R_4'$ represents hydrogen or lower alkyl, $R_4''$ stands for hydrogen, hydroxy or functionally converted hydroxy, and $R_4'''$ represents H(H), OH(H), functionally converted OH(H), oxo or functionally converted oxo. The 3-polyhydro-cyclopentanophenanthrenyl nucleus may contain additional substituents, such as, for example, lower alkyl (particularly in the 1-position, the 2-position, the 6-position, the 11-position, the 12-position, the 16-position and/or the 17-position), hydroxy or functionally converted hydroxy, particularly esterified hydroxy (primarily attached to the 6-position, the 7-position, the 11-position, the 12-position, the 14-position and/or the 16-position), including halogeno (substituting particularly the 2-position, the 4-position, the 6-position, the 9-position, the 12-position and/or the 16-position), or an oxo or functionally converted oxo group (present, for example, in the 7-position, the 11-position and/or the 12-position). Specific examples of such substituents have been described hereinbefore. Double bonds may also be present, for example, in the 1,2-position, the 4,5-position, the 9,11-position, the 14,15-position and/or the 16,17-position. As previously mentioned, the 3-polyhydro-cyclopentanophenanthrenyl radical is attached to the nitrogen atom of the oxazine portion through the carbon atom representing the 3-position.

Other polyhydro-cyclopentanophenanthrenyl radicals, which may represent the radical R, are the 7-polyhydro-cyclopentanophenanthrenyl radical of the formula

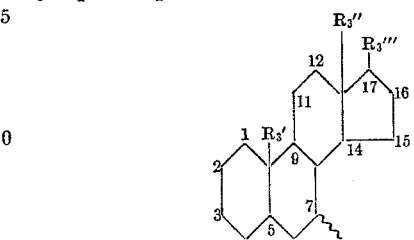

in which $R_3'$, $R_3''$ and $R_3'''$ have the previously-given meaning, the 16-polyhydro-cyclopentanophenanthrene nucleus of the formula

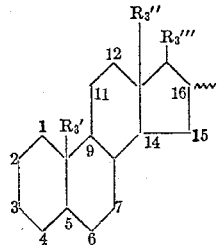

in which $R_3'$, $R_3''$ and $R_3'''$ have the previously-given meaning, or any other suitable polyhydro-cyclopentanophenanthrenyl nucleus, which may contain additional substituents or double bonds as previously mentioned.

The salts of the compounds of the present invention are primarily therapeutically acceptable acid addition salts with inorganic acids, particularly mineral acids, e.g. hydrochloric, hydrobromic, sulfuric, phosphoric acids and the like; with organic carboxylic acids, e.g. acetic, propionic, malonic, succinic, maleic, hydroxymaleic, dihydroxymaleic, melic, tartaric, citric, benzoic, mandelic acid and the like, or with organic sulfonic acids, e.g. methane sulfonic, ethane sulfonic, 2-hydroxyethane sulfonic, p-toluene sulfonic acid and the like.

Quarternary ammonium derivatives of the compounds of this invention are primarily those formed with reactive esters of lower alkanols with strong acids, such as those with lower alkyl halides, e.g. methyl, ethyl, n-propyl, isopropyl or n-butyl chloride, bromide or iodide and the like, di-lower alkyl sulfates, e.g. dimethyl sulfate, diethyl sulfate and the like, lower alkyl lower alkane sulfonates, e.g. methyl or ethyl methane or ethane sulfonate and the like, or lower alkyl carbocyclic aryl sulfonates, e.g. methyl p-toluene sulfonate and the like.

Compounds of the present invention have antibacterial effects against gram-positive organisms, such as, for example, *Staph. aureus, B. subtilis* and the like, or gram-negative bacteria, such as, for example, *E. coli, Ps. aeruginosa* and the like, as well as antifungal activities against fungi, such as, for example, *Nocardia asteroides, Trichophyton mentagrophytes, Histoplasma capsulatum, Blastomyces dermatitidis* and the like. These compounds can, therefore, be used as antibacterial and/or anti-fungal agents to counteract infections caused, for example, by the abovementioned microorganisms.

Particularly outstanding antibacterial and antifungal effects are exerted by compounds of the formula

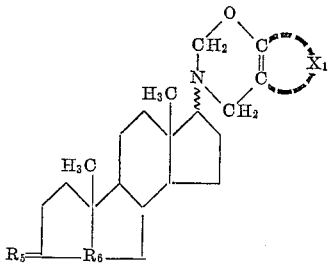

in which $R_5$ is represented by one of the groups of the formulae OH(H), OAc(H), in which Ac represents the acyl radical of a lower alkanoic acid, e.g., acetic, propionic, pivalic acid and the like, as well as by oxygen or lower alkylenedioxy, and in which the group of the formula

is represented by the formulae

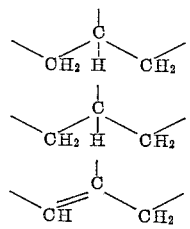

or

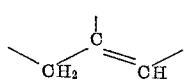

and in which the group of the formula

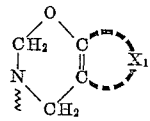

may be represented by the group of the formula

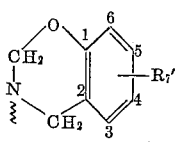

in which $R_7'$ stands for lower alkoxy, e.g. methoxy, ethoxy and the like, halogeno, e.g. chloro, bromo and the like, nitro, N-lower alkanoyl-amino, e.g. N-acetylamino, N-propionylamino and the like, and is primarily attached to the 4-position, or by the group of the formula

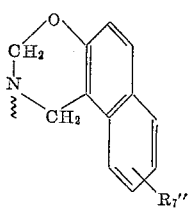

in which $R_7''$ represents hydrogen or has the same meaning as $A_7'$, the therapeutically acceptable acid addition salts, particularly with mineral acids, and the lower alkyl quaternary ammonium derivatives of such compounds.

Another group of compounds having outstanding antibacterial and antifungal effects are those of the formula

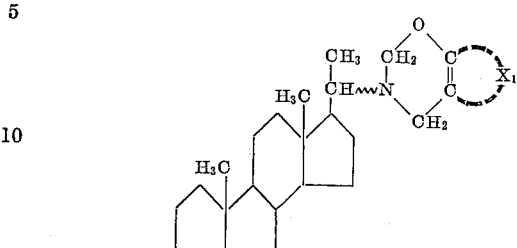

in which $R_5$, the radical of the formula

and the group of the formula

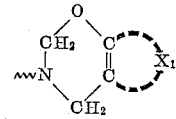

have the previously-given meaning, the therapeutically acceptable acid addition salts, particularly with mineral acids, and the lower alkyl quaternary ammonium derivatives of such compounds.

The invention may also be represented, for example, by the compounds of the formula

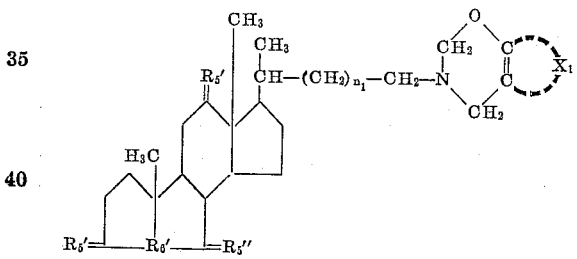

in which the group of the formula

has the previously-given meaning, and in which $R_5'$ represents the group of the formula OH(H) and $R_5''$ stands for H(H) or OH(H), the radical of the formula

represents one of the groups of the formula

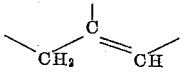

or

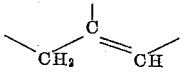

and in which $n_1$ stands for one of the whole numbers 0, 1 or 2, the therapeutically acceptable acid addition salts, particularly with mineral acids, and the lower alkyl quaternary ammonium derivatives of such compounds.

An additional group of very active compounds are those of the formula

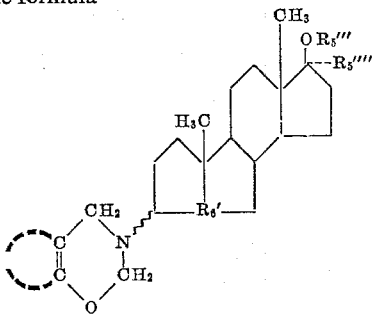

in which the group of the formula

and the group of the formula

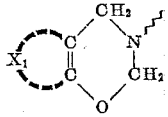

have the previously-given meaning, $R_5'''$ stands for hydrogen or lower alkanoyl and $R_5''''$ represents hydrogen or lower alkyl, the therapeutically acceptable acid addition salts, particularly with mineral acids, or the lower alkyl quaternary ammonium derivatives of such compounds.

The new compounds of this invention may be used in the form of pharmaceutical preparations, which contain the new steroid compounds, the salts or the quaternary ammonium compounds thereof in admixture with a pharmaceutical organic or inorganic, solid or liquid carrier suitable for enteral or parenteral administration. For making up the preparations there can be employed substances which do not react with the new compounds, such as water, gelatine, lactose, starches, stearic acid, magnesium stearate, stearyl alcohol, talc, vegetable oils, benzyl alcohols, gums, propylene glycol, polyalkylene glycols or any other known carrier for medicaments. The pharmaceutical preparations may be in solid form, for example, as capsules, tablets, dragees and the like, or in liquid form, for example, as solutions, suspensions, emulsions and the like. If desired, they may contain auxiliary substances, such as preserving, stabilizing, wetting, emulsifying agents and the like, salts for varying the osmotic pressure or buffers. They may also contain, in combination, other therapeutically useful substances.

The compounds of this invention can also be used as intermediates in the preparation of other, particularly pharmaceutically, useful compounds.

The compounds of the present invention may be prepared, for example, by reacting a phenolic compounds of the formula

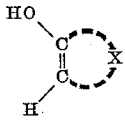

in which the divalent radical of the formula

has the previously-given meaning, with an amine of the formula $$R-NH_2$$

in which R has the previously-given meaning, and with at least two equivalent amounts of formaldehyde or a reactive derivative thereof, and/or, if desired, converting a resulting salt into a free compound, and/or, if desired, converting a resulting compound into a salt or a quaternary ammonium compound thereof.

The reaction is preferably carried out in the presence of diluents, particularly water-miscible, polar solvents, for example, alcohols, such as lower alkanols, e.g. methanol, ethanol, n-propanol, isopropanol and the like, ethers, e.g. tetrahydrofuran, p-dioxane, diethyleneglycol dimethylether and the like, ketones, e.g. acetone and the like, carboxylic acid amides, e.g., formamide, N,N-dimethylformamide and the like, or water or mixtures of such solvents, as well as less polar solvents, such as aliphatic hydrocarbons, e.g. hexane and the like, carbocyclic aryl hydrocarbons, e.g. benzene, toluene and the like, or any other suitable solvents. Normally, the amine and the phenol are given to the solution of the formaldehyde, which may be used as an aqueous solution thereof, or in the form of a polymer thereof, e.g. paraformaldehyde, trioxymethylene and the like, or of an acetal thereof with a lower alkanol, e.g. methanol, ethanol and the like, such as a di-lower alkoxy-methane, e.g. dimethoxymethane, diethoxymethane and the like. The reaction may be carried out in the presence of a condensing reagent, for example, a base, such as an alkali metal hydroxide, e.g. lithium hydroxide, sodium hydroxide, potassium hydroxide and the like. If necessary, the reaction mixture may be heated, for example, on the steam bath to about 80–90°, if desired, in the atmosphere of an inert gas, e.g. nitrogen.

The resulting benzoxazine compound may crystallize upon cooling, or it may be isolated by diluting the solution with a solvent differing from the one used in the reaction and, if necessary, extracting the product, or by evaporating the solution and crystallizing the residue. The reaction product is purified according to known methods, for example, by crystallization, recrystallization, adsorption, for example, on aluminum oxide or any other suitable adsorbent, and elution, or any other suitable method.

The starting materials used in the above reaction are known, or, if new, may be prepared according to known procedures.

The compounds of this invention may be obtained in the form of the free bases or as the salts thereof. A salt may be converted into the free base, for example, by reaction with an alkaline reagent, such as an alkali metal hydroxide, e.g. lithium, sodium or potassium hydroxide, an alkali metal carbonate, e.g. sodium or potassium carbonate or hydrogen carbonate, ammonia, an ion exchange resin or any other suitable reagent. A free base may be converted into its therapeutically useful acid addition salts by reaction with one of the inorganic or organic acids outlined hereinbefore; for example, a solution of the free base in a solvent, such as a lower alkanol, e.g. methanol, ethanol, propanol, isopropanol and the like, a monocyclic carbocyclic aryl hydrocarbon, e.g. benzene, toluene and the like, an ether, e.g. diethylether and the like, a halogenated aliphatic hydrocarbon, e.g. methylene chloride and the like, or in a mixture of such solvents may be reacted with the acid or a solution thereof and the desired salt may then be isolated.

Quaternary ammonium derivatives of the compounds of this invention may be obtained, for example, by reacting the tertiary base with an ester formed by a lower alkanol and a strong inorganic or organic acid. Such acids are more especially mineral acids, e.g. hydrochloric, hydrobromic, hydriodic, sulfuric acid and the like, or strong organic sulfonic acids, for example, lower alkane sulfonic acids, e.g. methane sulfonic acid, ethane sulfonic acid and the like, hydroxy-lower alkane sulfonic acids, e.g. 2-hydroxy-ethane sulfonic acid and the like, or carbocyclic aryl sulfonic acid, e.g. p-toluene sulfonic acid and the like. Useful reactive esters are, for example, lower alkyl halides, e.g. methyl, ethyl, n-propyl or iso-propyl chloride, bromide or iodide and the like, di-lower alkyl sulfates, e.g. dimethyl sulfate, diethyl sulfate and the like, lower alkyl lower alkane sulfonates, e.g. methyl or ethyl methane or ethane sulfonate and the like, lower alkyl hydroxy-lower alkane sulfonates, e.g. methyl 2- hydroxy-ethane sulfonate, or lower alkyl carbocyclic aryl sulfonates, e.g. methyl p-toluene sulfonate and the like.

The quaternizing reaction may be performed in the absence or in the presence of a solvent, under cooling, at room temperature or at an elevated temperature, at atmospheric pressure or in a closed vessel under pressure, and if desired, in the atmosphere of an inert gas, e.g. nitrogen. Suitable solvents are more especially lower alkanols, e.g. methanol, ethanol, propanol, isopropanol, butanol, pentanol and the like, lower alkanones, e.g. acetone, methyl ethyl ketone and the like, organic acid amides, e.g. formamide, dimethylformamide and the like, monocyclic carbocyclic aryl hydrocarbons, e.g. benzene and the like, halogenated hydrocarbons, e.g. methylene chloride and the like, ethers, e.g. diethyl ether and the like, or any other equivalent solvent.

The invention also comprises any modification of the process wherein a compound obtainable as an intermediate at any stage of the process is used as starting material and the remaining step(s) of the process is(are) carried out, as well as any new intermediates.

In the process of this invention such starting materials are preferably used which lead to final products mentioned in the beginning as preferred embodiments of the invention.

The following examples are intended to illustrate the invention and are not to be construed as being limitations thereon. Temperatures are given in degrees centigrade.

*Example 1*

A trace of potassium hydroxide and 0.9 g. of trioxymethylene are dissolved in 75 ml. of anhydrous n-propanol while warming. The solution is cooled in ice, 4.8 g. of 17-amino-5-androstene-3β-ol[Ruzicka et al., Helv. Chim. Act., vol. 19, p. 107 (1936)] is added, followed by 2.27 g. of 4-(N-acetylamino)-phenol. The solution is refluxed under an atmosphere of nitrogen for fifteen hours and is then concentrated to dryness. The residue is suspended in 50 ml. of benzene, the insoluble material is filtered off and recrystallized from methanol. This product is digested with 250 ml. of chloroform, the insoluble material is filtered off and recrystallized from ethanol to yield the 6-(N-acetylamino)-2,4-dihydro-3-(3β-hydroxy-5-androsten-17-yl)-1,3-benzoxazine of the formula

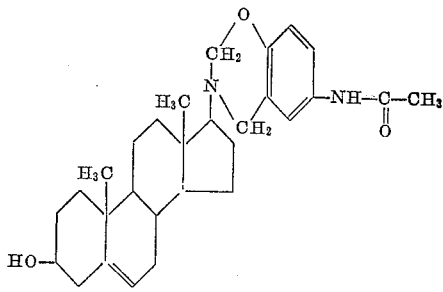

which melts at 253–254°; yield: 0.9 g.

The 4-(N-acetylamino)-phenol may be replaced by 1.86 g. of 4-methoxy-phenol; upon reaction with 4.8 g. of 17-amino-5-androstene-3β-ol and 0.9 g. of trioxymethylene in the presence of a trace amount of potassium hydroxide and n-propanol according to the procedure described hereinabove, it yields the desired 2,4-dihydro-3-(3β-hydroxy - 5 - androsten-17-yl)-6-methoxy-1,3-benzoxazine, which melts at 159–160°; yield: 28 percent.

*Example 2*

To a cold solution of 0.38 g. of trioxymethylene and a trace of potassium hydroxide in 5 ml. of methanol is added 2.0 g. of 17-amino-androstane-3β-ol in 40 ml. of methanol, followed by 9.10 g. of β-naphthol. The reaction mixture is allowed to stand for one hour at room temperature under an atmosphere of nitrogen and is then refluxed for ninety minutes. A crystalline product precipitates on chilling, which is filtered off and recrystallized from a mixture of methylene chloride and ethanol to yield the desired 2,3-dihydro-2-(3β-hydroxy-17-androstanyl)-1H-naphth[1,2-e]-m-oxazine of the formula

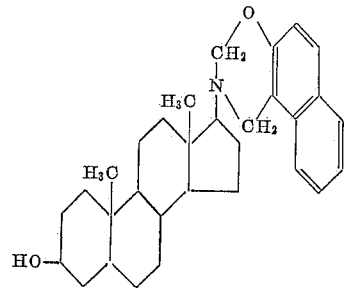

which melts at 227–228°; yield: 2.56 g.

The starting material may be prepared as follows: To a refluxing solution of 4.7 g. of 3β-hydroxy-17-oximino-androstane [Ruzicka et al., Helv. Chim. Acta, vol. 17, p. 1395 (1934)] in 130 ml. of propanol is added slowly and in portions a total of 10.0 g. of sodium. The cooled solution is poured into 3000 ml. of water, the precipitate is filtered off, washed with water and recrystallized several times from methanol and then from a mixture of methylene chloride and hexane to yield the desired 17-amino - 3β - hydroxy-androstane, M.P. 163–164°; yield: 2.8 g.

The 2,3-dihydro-2-(3β-hydroxy-5-androsten-17-yl)-1H-naphth[1,2-e]-m-oxazine (M.P. 223–224°; yield: 79 percent), and 2,3-dihydro-2-(3α-hydroxy - 17 - androstanyl)-1H-naphth[1,2-e]-m-oxazine (M.P. 175–176°; yield: 54 percent) are prepared according to the above-outlined procedure by selecting the appropriate starting materials.

*Example 3*

To a cold solution of 0.38 g. of trioxymethylene and a trace of potassium hydroxide in 25 ml. of anhydrous propanol is added 2.0 g. of 20α-amino-3β-hydroxy-5α-pregnane, followed by 0.78 g. of 4-methoxy-phenol. The reaction mixture is refluxed under an atmosphere of nitrogen for fifteen hours and then concentrated to dryness under reduced pressure; the residue is triturated with methanol and the solid material is filtered off. The desired 2, 4- dihydro-3-(3β-hydroxy-5α-pregnan-20α-yl)-6-methoxy-1,3-benzoxazine of the formula

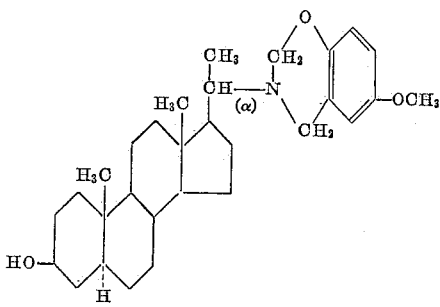

melts at 125–127° after repeated recrystallization from a mixture of methylene chloride and methanol; yield: 1.1 g.

The starting material in the above reaction may be prepared as follows: A solution of 7.0 g. of 3β-acetoxy-20α-amino-5-pregnene, prepared according to the procedures of Julian et al., J. Am. Chem. Soc., vol. 70, p. 888 (1948), in 100 ml. of a 2% methanol solution of potassium hydroxide is refluxed for two hours. The reaction mixture is poured into an excess of water and the aqueous solution extracted with ether. The ether solution is washed with water, dried over sodium sulfate and the solvent is removed, leaving 5.7 g. of 20α-amino-3β-hydroxy-5-pregnene which, after recrystallization from ethyl acetate, melts at 172–174°; [α]$_D^{25°}$=−69.2° (in chloroform).

A solution of 3.65 g. of 20α-amino-3β-hydroxy-5-pregnene in 50 ml. of glacial acetic acid is treated with hydrogen under atmospheric pressure and in the presence of platinum oxide. Upon completion of the reduction the catalyst is filtered off, the filtrate is concentrated to dryness under reduced pressure and the residue dissolved in warm aqueous methanol, to which a small amount of 10 percent aqueous sodium hydroxide has been added. The 20α-amino-3β-hydroxy-5-α-pregnane precipitates in white crystals and is recrystallized from a mixture of ethanol and water, M.P. 171–173°; yield: 2.55 g.

By selecting the appropriate starting materials and following the above-described procedure, the 2,4-dihydro-3 - (3β - hydroxy-5α-pregnan-20β-yl)-6-methoxy-1,3-benzoxazine (M.P. 155–156° after repeated recrystallization from a mixture of methylene chloride and heptane; yield: 31 per cent) and the 2,4-dihydro-3-(3β-hydroxy-5-pregnen-20β-yl)-6-methoxy-1,3-benzoxazine (M.P. 152°, after recrystallizaton from a mixture of methylene chloride and methanol and drying at 110°; yield: 21 percent) can be prepared.

The starting materials used for the preparation of the above-mentioned compounds may be prepared as follows: A solution of 13.4 g. of 3β-hydroxy-20-oximino-5α-pregnane (prepared by treatment of a solution of 3β-hydroxy-20-oxo-5α-pregnane in pyridine with hydroxylamine hydrochloride) in 750 ml. of dry n-propanol is refluxed while 25 g. of sodium is added in portions over a period of forty-five minutes. Refluxing is continued until all the sodium is dissolved. The solution is concentrated under reduced pressure to a volume of 350 ml., then diluted with 3000 ml. of cold water. The white, crystalline material is filtered off, washed with water and recrystallized from methanol to yield 8.5 g. of 20β-amino-3β-hydroxy-5α-pregnane.

To a refluxing solution of 11.39 g. of the oxime of 3β-acetoxy-20-oxo-5-pregnene in 800 ml. of dry n-propanol is added 18 g. of sodium in small pieces over a period of three hours. About 300 ml. of the solvent is removed under reduced pressure and approximately 1000 ml. of water is added. The aqueous solution is extracted with ethyl acetate, the organic layer is washed with water, dried over sodium sulfate and then filtered. An ether solution of hydrogen chloride is added and 5.3 g. of 20β-amino-3β-hydroxy-5-pregnene hydrochloride is obtained.

The salt is dissolved in warm ethanol by adding a small volume of water, and 10 percent aqueous sodium hydroxide is added to pH 8 to 9. On dilution with water the 20β-amino-3β-hydroxy-5-pregnene precipitates, is filtered off and dried. After recrystallization from methanol and from ethyl acetate it melts at 173–174°; yield: 4.2 g.

Example 4

To a solution of 0.39 g. of trioxymethylene and a trace of potassium hydroxide in 30 ml. of anhydrous n-propanol is added 2.1 g. of 20β-amino-3β-hydroxy-5-pregnene, followed by 1.0 g. of 4-(N-acetylamino)-phenol. The reaction mixture is refluxed for fifteen hours under an atmosphere of nitrogen and then cooled; the solid material is filtered off, the mother liquor is concentrated under reduced pressure and the residue is triturated with ethanol to yield an additional amount of the desired product. The 6-(N-acetylamino)-2,4-dihydro-3-(3β-hydroxy-5-pregnen-20β-yl)-1,3-benzoxazine of the formula

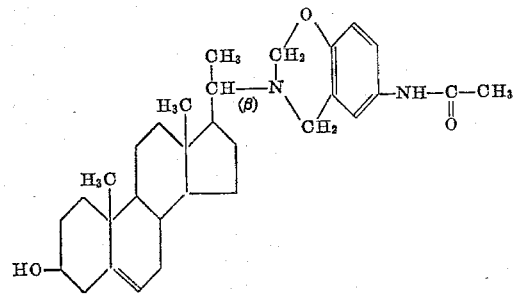

is purified by recrystallization from ethanol, M.P. 249–250°; yield: 0.68 g.

The 6-(N-acetylamino)-2,4-dihydro-3-(3β-hydroxy-5α-pregnan-20α-yl)-1,3-benzoxazine (M.P. 247–248°; yield: 29 percent) and 6-(N-acetylamino - 2,4 - dihydro-3-(3β-hydroxy-5α-pregnan-20β-yl)-1,3-benzoxazine (M.P. 245–247°; yield: 24 percent) are prepared according to the above-given procedure by selecting the appropriate starting material.

Example 5

1.0 g. of 20β-amino-3β-hydroxy-5α-pregnane in 15 ml. of methanol, followed by 0.45 g. of β-naphthol, is added to a cold solution of 0.19 g. of trioxymethylene and a trace of potassium hydroxide in 5 ml. of methanol. The reaction mixture is refluxed under an atmosphere of nitrogen for two hours and is then chilled to yield the desired 2,3-dihydro-2-(3β - hydroxy-5α-pregnan-20β-yl)-1H-naphth[1,2-e]-m-oxazine of the formula

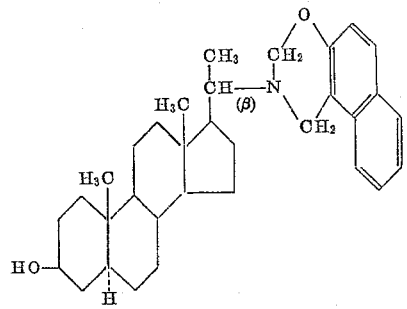

The product is purified by repeated recrystallization from a mixture of methylene chloride and methanol, M.P. 138–140°; yield: 1.2 g. (crude).

The 2,3-dihydro-2-(3β-hydroxy - 5α - pregnan-20α-yl)-1H-naphth[1,2-e]-m-oxazine (M.P. 197–199°; yield: 63 percent) and the 2,3-dihydro-2-(3β-hydroxy-5-pregnen-20β-yl)-1H-naphth[1,2-e]-m-oxazine (M.P. 188–189°, after repeated recrystallization from a mixture of benzene and petroleum ether and a mixture of methylene chloride and methanol; yield: 18 percent) can be prepared by selecting the corresponding starting materials and carrying out the procedure previously shown.

Example 6

A solution of 1.0 g. of 23-amino-3α,12α-dihydroxynorcholane hydrochloride in 3 ml. of methanol is added 3.7 ml. of a 3.8 percent methanol solution of potassium hydroxide. The resulting potassium chloride is filtered off and 0.15 g. of trioxymethylene in 1 ml. of methanol containing a trace of potassium hydroxide, followed by 0.36 g. of β-naphthol is added. The reaction mixture is refluxed under a nitrogen atmosphere for 1.5 hours, then concentrated to dryness under reduced pressure, the residue is dissolved in ethyl acetate, a small amount of diethyl ether is added and the solution is filtered. The filtrate is concentrated under reduced pressure, the residue is dissolved in benzene and the desired 2,3-dihydro-2-(3α,12α-dihydroxy - 23 - norcholanyl)-1H-naphth[1,2-e]-m-oxazine of the formula

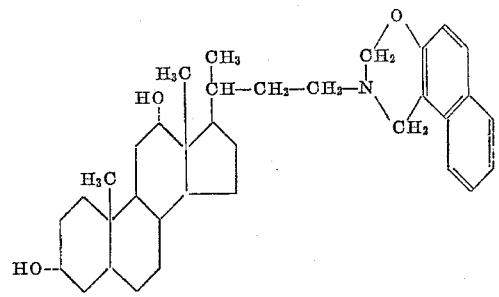

is precipitated as the hydrochloride by adding dropwise a solution of hydrogen chloride in benzene. The hydrochloride is recrystallized from a mixture of ethanol and ether, M.P. 155–156°.

The starting material may be prepared as follows: A solution of 18.0 g. of 3α,12α-diacetoxy-norcholic acid [Kazuno et al., J. Biochem (Japan), vol. 29, p. 421 (1939)] in 20 ml. of thionyl chloride is allowed to stand at room temperature for three hours and is then evaporated to dryness under reduced pressure. Dry benzene is added, the solvent is evaporated under reduced pressure to remove remaining thionyl chloride. The residue is triturated with petroleum ether, the precipitate is filtered off and added immediately to 50 ml. of liquid ammonia while rapidly stirring. The ammonia is allowed to evaporate, the residue is washed with water and recrystallized from ethyl acetate to yield the 3α,12α-diacetoxy-norcholic acid amide, M.P. 201–202°; yield: 10.0 g.

A solution of 9.0 g. of the above amide in 90 ml. of dry tetrahydrofuran is added to 5.4 g. of lithium aluminum hydride in 900 ml. of tetrahydrofuran over a period of one hour. The reaction mixture is refluxed for three hours, 30 ml. of water is cautiously added, followed by a small amount of powdered cellulose. The solid materials are filtered off, washed with ether and the filtrate is concentrated under reduced pressure. The residue is dissolved in chloroform, dry hydrogen chloride is passed through the solution, the solvent is decanted and the residue is recrystallized from a mixture of ethanol and diethyl ether to yield the hydrochloride of 23-amino-3α,12α-dihydroxy-norcholane, M.P. 300–302°; yield: 7.2 g.

Example 7

1.00 g. of 24-amino-3α,7α,12α-trihydroxy-cholane hydrochloride [Wessely et al., Monatsh. Chem., vol. 82, p. 437 (1951)] is converted into the free base by treatment of a methanol solution with methanolic potassium hydroxide; after filtering off the resulting potassium chloride, 0.14 g. of trioxymethylene in 1 ml. of methanol containing a small amount of potassium hydroxide and 0.34 g. of β-naphthol are added. The reaction mixture is treated and worked up as shown in Example 6 to yield the hydrochloride of 2,3-dihydro-2-(3α,7α,12α-trihydroxy-24-cholanyl)-1H-naphth[1,2-e]-m-oxazine of the formula

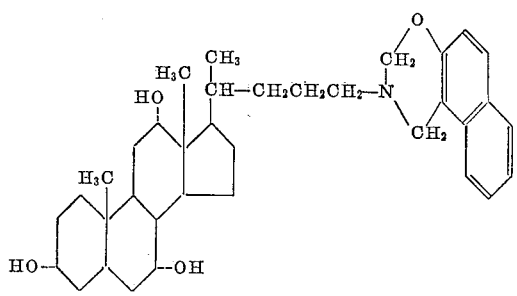

M.P. 171–174° after recrystallization from a mixture of methanol and diethyl ether.

Example 8

The potassium chloride, precipitating from a mixture of 10.0 g. of 24-amino-3α,7α,12α-trihydroxy-cholane hydrochloride and 13.0 ml. of methanolic potassium hydroxide, is filtered off, the filtrate is cooled in ice and a solution of 1.4 g. of trioxymethylene in 10 ml. of methanol containing a trace of potassium hydroxide, followed by 4.00 g. of 4-bromo-phenol is added. The solution is refluxed under a nitrogen atmosphere for fifteen hours, is then cooled and concentrated to dryness under reduced pressure. A solution of the residue in 30 ml. of a 1:1-mixture of methylene chloride and benzene is chromatographed on 200 g. of aluminum oxide (Woelm, neutral activity II); the column is developed with (a) 500 ml. of benzene, (b) 250 ml. of a 1:1-mixture of methylene chloride and benzene, (c) methylene chloride and (d) methylene chloride containing one percent of methanol. The (c)- and (d)- fractions are combined and the solvents evaporated. The residue does not crystallize; a benzene solution of the latter is added to cold petroleum ether and the desired 6-bromo-2,4-dihydro-3-(3α,7α,12α-trihydroxy-24-cholanyl)1,3-benzoxazine of the formula

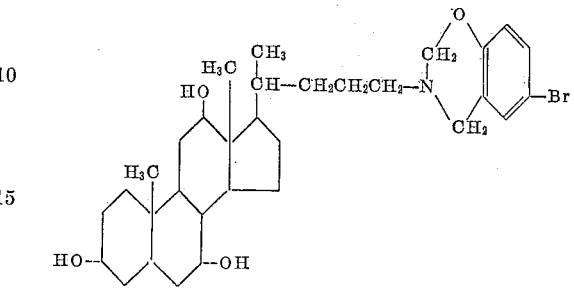

precipitates, yield: 3.2 g.

The 2,4-dihydro-6-methoxy-3-(3α,7α,12α-trihydroxy-24-cholanyl)-1,3-benzoxazine (non-crystalline; yield: 34 percent) and 2,4-dihydro-6-methyl-3-(3α,7α,12α-trihydroxy-24-cholanyl)-1,3-benzoxazine (non-crystalline; yield: 26 percent) are prepared according to the above-mentioned procedure.

Example 9

0.5 g. of 2,4-dihydro-3-(3β-hydroxy-5α-pregnan-20α-yl)-6-methoxy-1,3-benzoxazine is dissolved in an excess of methyl iodide; the reaction mixture is allowed to stand for several days at room temperature. The excess methyl iodide is distilled off under reduced pressure and the residue is recrystallized from methanol to yield the methiodide of 2,4-dihydro-3-(3β-hydroxy-5α-pregnan-20α-yl)-6-methoxy-1,3-benzoxazine.

Example 10

Hydrogen chloride gas is passed through a cold solution of 0.8 g. of dihydro-3-(3β-hydroxy-5α-pregnan-20α-yl)-6-methoxy-1,3-benzoxazine in benzene; the resulting 2,4-dihydro-3-(3β-hydroxy-5α-pregnan-20α-yl)-6-methoxy-1,3-benzoxazine precipitates, is filtered off and recrystallized from a cold mixture of ethanol and diethyl ether.

What is claimed is:
1. 6 - (N - acetylamino)-2,4-dihydro-3-(3β-hydroxy-5-androsten-17-yl)-1,3-benzoxazine.
2. 2,4 - dihydro - 3-(3β-hydroxy-5-androsten-17-yl)-6-methoxy-1,3-benzoxazine.
3. 2,3 - dihydro - 2 - (3α-hydroxy-17-androstanyl)-1H-naphth[1,2-e]-m-oxazine.
4. 2,3 - dihydro-2-(3β-hydroxy-5-androsten-17-yl)-1H-naphth[1,2-e]-m-oxazine.
5. 2,3 - dihydro - 2 - (3β-hydroxy-17-androstanyl)-1H-naphth[1,2-e]-m-oxazine.
6. 2,4 - dihydro - 3-(3β-hydroxy-5α-pregnan-20α-yl)-6-methoxy-1,3-benzoxazine.
7. 2,4 - dihydro - 3-(3β-hydroxy-5α-pregnan-20β-yl)-6-methoxy-1,3-benzoxazine.
8. 2,4 - dihydro-3-(3β-hydroxy-5-pregnen - 20β - yl)-6-methoxy-1,3-benzoxazine.
9. 6 - (N - acetylamino)-2,4-dihydro-3-(3β-hydroxy-5-pregnen-20β-yl)-1,3-benzoxazine.
10. 6 - (N - acetylamino)-2,4-dihydro-3-(3β-hydroxy-5α-pregnan-20α-yl)-1,3-benzoxazine.
11. 6 - (N - acetylamino)-2,4-dihydro-3-(3β-hydroxy-5α-pregnan-20β-yl)-1,3-benzoxazine.
12. 2,3 - dihydro - 2-(3β-hydroxy-5α-pregnan-20β-yl)-1H-naphth[1,2-e]-m-oxazine.
13. 2,3 - dihydro - 2-(3β-hydroxy-5a-pregnan-20α-yl)-1H-naphth[1,2-e]-m-oxazine.
14. 2,3 - dihydro - 2-(3β-hydroxy-5-pregnan-20β-yl)-1H-naphth[1,2-e]-m-oxazine.
15. 2,3 - dihydro - 2-(3α,12α-dihydroxy-23-norcholan-yl)-1H-naphth[1,2-e]-m-oxazine.

16. 2,3 - dihydro-2-(3α,7α,12α-trihydroxy-24-cholanyl)-1H-naphth[1,2-e]-m-oxazine.
17. 6 - bromo-2-4-dihydro-3-(3α,7α,12α-trihydroxy-24-cholanyl)-1,3-benzoxazine.
18. 2,4 - dihydro - 6-methoxy-3-(3α,7α,12α-trihydroxy-24-cholanyl)-1,3-benzoxazine.
19. 2,4 - dihydro-6-methyl-3-(3α,7α,12α-trihydroxy-24-cholanyl)-1,3-benzoxazine.
20. A member selected from the group consisting of compounds of the formulae:

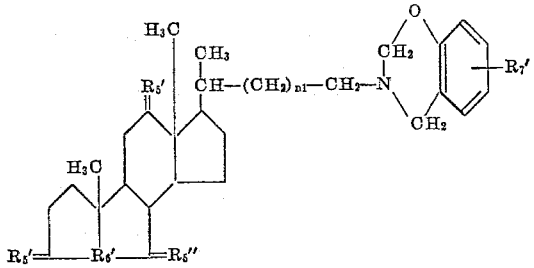

and

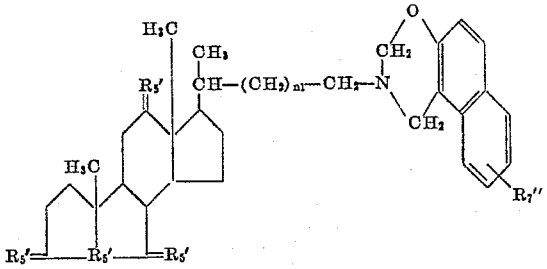

in which $R_5'$ represents the group of the formula OH(H), and $R_5''$ stands for a member selected from the group consisting of the groups of the formulae H(H) and OH(H), the radical of the formula:

represents one of the formulae selected from the group consisting of

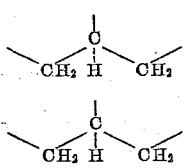

and

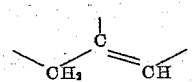

$n_1$ represents one of the whole numbers 0, 1 and 2, and in which each of the groups $R_7'$ and $R_7''$ represents a member selected from the group consisting of hydrogen, lower alkoxy, halogeno, nitro and N-lower alkanoylamino, the therapeutically acceptable acid addition salts thereof and the lower alkyl quaternary ammonium derivatives thereof.

21. A member selected from the group consisting of a compound having one of the formulae:

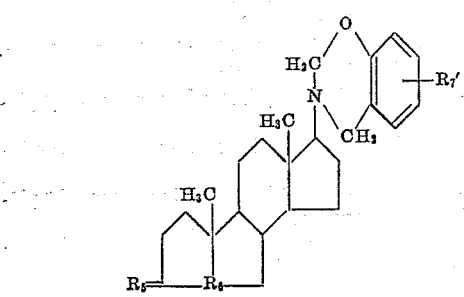

and

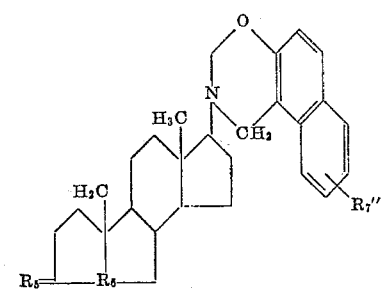

in which $R_5$ is a member selected from the group consisting of —OH(H), —OAc(H), in which Ac stands for lower alkanoyl, and lower alkylenedioxy, and the radical of the formula:

stands for one of the formulae selected from the group consisting of

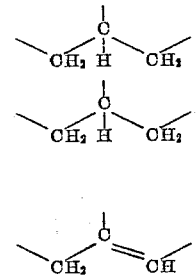

and

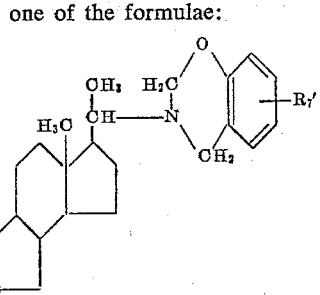

and in which each of the groups $R_7'$ and $R_7''$ is a member selected from the group consisting of hydrogen, lower alkoxy, halogeno, nitro and N-lower alkanoylamino, the pharmacologically acceptable acid addition salts thereof and the lower alkyl quaternary ammonium derivatives thereof.

22. A member selected from the group consisting of a compound having one of the formulae:

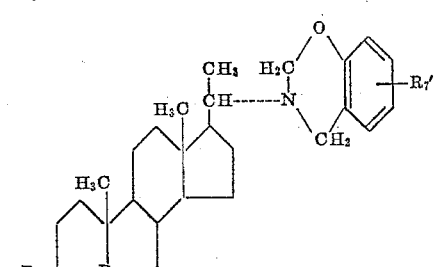

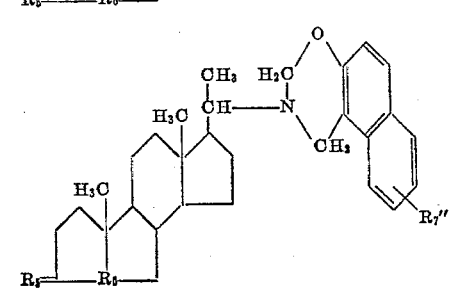

and

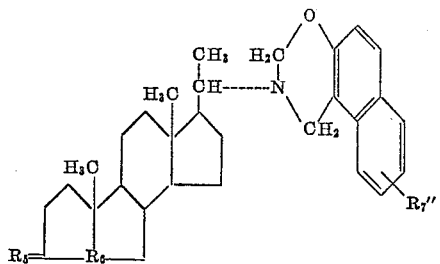

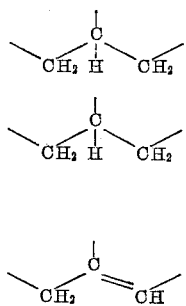

and in which $R_5$ is a member selected from the group consisting of —OH(H), —OAc(H), in which Ac stands for lower alkanoyl, and lower alkylenedioxy, and the radical of the formula:

stands for one of the formulae selected from the group consisting of and each of the groups $R_7'$ and $R_7''$ is a member selected from the group consisting of hydrogen, lower alkoxy, halogeno, nitro and N-lower alkanoylamino, the pharmaceutically acceptable acid addition salts thereof and the lower alkyl quaternary ammonium derivatives thereof.

No references cited.

UNITED STATES PATENT OFFICE
CERTIFICATE OF CORRECTION

Patent No. 3,063,990　　　　　　　　　　　　November 13, 1962

Martin Eric Kuehne

It is hereby certified that error appears in the above numbered patent requiring correction and that the said Letters Patent should read as corrected below.

Column 15, line 3, for "-bromo-2-4-" read -- -bromo-2,4- --; lines 11 to 22, and lines 23 to 31, for the portion of the formulae reading "-(CH$_2$)$_{n1}$-", each occurrence, read -- -(CH$_2$)$_{n_1}$- --; same column 15, lines 23 to 31, for the lower left-hand portion of the formula reading

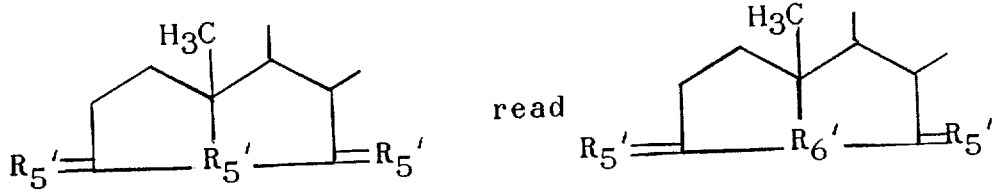

column 16, lines 3 to 13, the lower left-hand portion of the formula should appear as shown below instead of as in the patent:

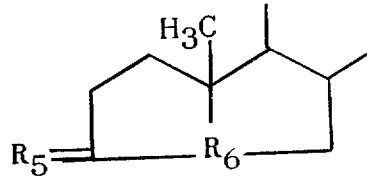

Signed and sealed this 26th day of May 1964.

(SEAL)
Attest:

ERNEST W. SWIDER
Attesting Officer

EDWARD J. BRENNER
Commissioner of Patents